(12) United States Patent
Tamura et al.

(10) Patent No.: US 9,434,813 B2
(45) Date of Patent: Sep. 6, 2016

(54) POLYESTER RESIN FOR TONERS, METHOD FOR PRODUCING SAME, AND TONER

(71) Applicant: Mitsubishi Rayon Co., Ltd., Chiyoda-ku (JP)

(72) Inventors: Yoko Tamura, Toyohashi (JP); Masaru Sugiura, Toyohashi (JP)

(73) Assignee: Mitsubishi Rayon Co., Ltd., Chiyoda-ku (JP)

( * ) Notice: Subject to any disclaimer, the term of this patent is extended or adjusted under 35 U.S.C. 154(b) by 0 days.

(21) Appl. No.: 14/646,071

(22) PCT Filed: Dec. 6, 2013

(86) PCT No.: PCT/JP2013/082832
§ 371 (c)(1),
(2) Date: May 20, 2015

(87) PCT Pub. No.: WO2014/088097
PCT Pub. Date: Jun. 12, 2014

(65) Prior Publication Data
US 2015/0291730 A1    Oct. 15, 2015

(30) Foreign Application Priority Data

Dec. 7, 2012    (JP) ................. 2012-267785

(51) Int. Cl.
| | | |
|---|---|---|
| C08G 63/02 | (2006.01) | |
| C08G 63/193 | (2006.01) | |
| C08G 63/668 | (2006.01) | |
| G03G 9/087 | (2006.01) | |
| C08G 63/42 | (2006.01) | |
| C08G 64/00 | (2006.01) | |

(52) U.S. Cl.
CPC ............ *C08G 63/193* (2013.01); *C08G 63/42* (2013.01); *C08G 63/668* (2013.01); *G03G 9/087* (2013.01); *G03G 9/08755* (2013.01); *G03G 9/08795* (2013.01); *G03G 9/08797* (2013.01)

(58) Field of Classification Search
CPC .......................... C08G 63/193; C08G 63/42
USPC ................. 528/190, 193, 194, 271, 272; 430/108.1, 108.4, 109.4
See application file for complete search history.

(56) References Cited

U.S. PATENT DOCUMENTS

| | | |
|---|---|---|
| 6,455,135 B1 | 9/2002 | Kamiyama et al. |
| 2003/0232959 A1 | 12/2003 | Adelman et al. |
| 2004/0092703 A1 | 5/2004 | Germroth et al. |
| 2010/0316944 A1 | 12/2010 | Nakajima et al. |
| 2011/0212396 A1 | 9/2011 | Farrugia et al. |
| 2012/0156607 A1* | 6/2012 | Farrugia ............... G03G 9/0804 430/108.4 |
| 2012/0264047 A1 | 10/2012 | Farrugia et al. |
| 2012/0276479 A1* | 11/2012 | Yoo .................... G03G 9/08755 430/109.4 |
| 2013/0171555 A1 | 7/2013 | Kubo et al. |
| 2015/0152219 A1 | 6/2015 | Tamura et al. |

FOREIGN PATENT DOCUMENTS

| | | |
|---|---|---|
| JP | 11-174711 A | 7/1999 |
| JP | 1 1-241 004 A | 9/1999 |
| JP | 2004-197051 A | 7/2004 |
| JP | 2005-300996 A | 10/2005 |
| JP | 2005-530000 A | 10/2005 |
| JP | 2006-506485 A | 2/2006 |
| JP | 2008 537786 | 9/2008 |
| JP | 2010-90315 A | 4/2010 |
| JP | 2010 95696 | 4/2010 |
| JP | 2010 215770 | 9/2010 |
| JP | 2010 285555 | 12/2010 |
| JP | 2010 286610 | 12/2010 |
| JP | 2011-180591 A | 9/2011 |
| JP | 2011-227221 | 11/2011 |
| JP | 2011-232665 A | 11/2011 |
| JP | 2012-73304 A | 4/2012 |
| JP | 2012 133356 | 7/2012 |
| JP | 2012 145600 | 8/2012 |
| JP | 2012 521468 | 9/2012 |
| JP | 2012 214680 | 11/2012 |
| JP | 2013 231148 | 11/2013 |
| KR | 10 2012 00565 | 6/2012 |
| WO | WO 03/106531 A1 | 12/2003 |
| WO | 2006 102280 | 9/2006 |
| WO | 2010 108964 | 9/2010 |
| WO | 2012 043531 | 4/2012 |

OTHER PUBLICATIONS

International Search Report Issued Jan. 7, 2014 in PCT/JP2013/082832 filed Dec. 6, 2013.
International Search Report issued Jul. 16, 2013 in PCT/JP2013/066061 (with English language translation).
Japanese Office Action mailed Jul. 12, 2016 in counterpart Japanese Patent Application No. 2013-529464 (w/ Machine Translation obtained by Global Dossier on Jul. 14, 2016).

* cited by examiner

*Primary Examiner* — Terressa Boykin
(74) *Attorney, Agent, or Firm* — Oblon, McClelland, Maier & Neustadt, L.L.P

(57) ABSTRACT

The invention relates to a polyester resin for toner, the polyester resin containing a monomer unit derived from isosorbide and a monomer unit derived from 1,2-propanediol, in which the proportion of the monomer unit derived from isosorbide is from 2 to 11% by mass with respect to the total mass of the polyester resin, and a glass transition temperature (Tg) of the polyester resin for toner is from 56 to 70° C. According to the invention, it is possible to provide a polyester resin for toner from which toner excellent in storage stability, fixing property, hot offset resistance and image stability in the case of using isosorbide is obtained, and a method for producing the polyester resin for toner. In addition, the toner obtained from the polyester resin for toner of the invention is excellent in storage stability, fixing property, hot offset resistance and image stability in the case of using isosorbide.

13 Claims, No Drawings

POLYESTER RESIN FOR TONERS, METHOD FOR PRODUCING SAME, AND TONER

TECHNICAL FIELD

The present invention relates to a polyester resin for toner, a method for producing the same, and toner.

This application is based upon and claims the benefit of priority of the prior Japanese Patent Application No. 2012-267785, filed on Dec. 7, 2012, the entire contents of which are incorporated herein by reference.

BACKGROUND ART

In the method for obtaining an image by an electrophotographic printing method or an electrostatic printing method, an electrostatic image formed on a photoreceptor is developed with toner charged by friction in advance and then fixed.

As the fixing technique, there are a heat roller technique in which the toner image obtained by development is fixed using a pressurized and heated roller and a non-contact fixing technique in which the toner image obtained by development is fixed using an electric oven or flash beam light.

In order to pass through these processes without any problem, toner is required to be able to maintain a stable charged amount and to exhibit favorable fixing property on the paper.

Moreover, toner is also required to be equipped with improved toner characteristics such as storage stability, low-temperature fixing property and hot offset resistance due to the tendency of an increase in speed, miniaturization, energy saving and the like of printers in recent years.

The binder resin for toner is a material that greatly affects the toner characteristics described above. Hitherto, a polyester resin, which is excellent in toughness and fixing property at a low temperature and exhibits a favorable performance balance, has been used as a binder resin.

In addition, the switchover from plastics derived from petroleum raw materials of the related art to biomass-based plastics has been attempted in recent years from the viewpoint of reducing the environmental impact such as global warming suppression.

For toner as well, those which are produced using biomass-based raw materials are desired, and also for the binder resin constituting the toner, those which are produced using biomass-based raw materials are desired.

As the polyester resin produced using a biomass-based raw material, for example, a polyester resin for toner produced using isosorbide derived from a plant raw material as a polyhydric alcohol is disclosed in Patent Document 1.

In addition, a polyester resin for toner produced using isosorbide derived from a plant is described in Patent Document 2.

CITATION LIST

Patent Document

Patent Document 1: JP 2010-285555 A
Patent Document 2: JP 2008-537786 W

SUMMARY OF THE INVENTION

Problem to be Solved by the Invention

However, the polyester resins for toner described in Patent Documents 1 and 2 are deficient in balance among storage stability, fixing property, hot offset resistance and image stability.

An object of the invention is to solve this problem and to provide a polyester resin for toner excellent in storage stability, fixing property, hot offset resistance and image stability in an ester resin for toner containing isosorbide.

Means for Solving Problem

The first gist of the invention is a polyester resin for toner which contains a repeating unit derived from isosorbide at from 2 to 11% by mass and a repeating unit derived from 1,2-propanediol and has a glass transition temperature (Tg) of from 56 to 70° C.

In other words, the invention has the following embodiments.

[1] A polyester resin for toner, the polyester resin containing a constitutional unit derived from biomass at 30% by mass or more and a constitutional unit derived from isosorbide at from 2 to 11% by mass and having a glass transition temperature (Tg) of from 56 to 70° C.

[2] The polyester resin for toner described in [1], the polyester resin containing a constitutional unit derived from 1,2-propylene glycol.

[3] The polyester resin for toner described in [1] or [2], in which isosorbide and/or 1,2-propylene glycol are derived from biomass.

[4] A method for producing the polyester resin for toner described in [1], the production method including polycondensation of a mixture containing a polyhydric alcohol containing a raw material derived from biomass at 30% by mass or more and isosorbide at from 2 to 11% by mass and a polycarboxylic acid.

[5] The method for producing a polyester resin for toner described in [4], in which the mixture contains 1,2-propylene glycol at from 10 to 20% by mass.

[6] The method for producing a polyester resin for toner described in [4] or [5], in which isosorbide and/or 1,2-propylene glycol is derived from biomass.

[7] Toner containing the polyester resin for toner described in any one of [1] to [3].

In addition, the invention has the following aspects.

<1> A polyester resin for toner, the polyester resin containing:
a monomer unit derived from isosorbide; and
a monomer unit derived from 1,2-propanediol, in which
a proportion of the monomer unit derived from isosorbide is from 2 to 11% by mass with respect to a total mass of the polyester resin, and
a glass transition temperature (Tg) of the polyester resin is from 56 to 70° C.

<2> The polyester resin for toner described in <1>, the polyester resin containing a monomer unit derived from a biomass-based monomer at 2% by mass or more with respect to a total mass of the polyester resin.

<3> A polyester resin for toner, in which
a proportion of a monomer unit derived from a biomass-based monomer is 30% by mass or more with respect to a total mass of the polyester resin, a proportion of a monomer unit derived from isosorbide is from 2 to 11% by mass with respect to a total mass of the polyester resin, and a glass transition temperature (Tg) of the polyester resin is from 56 to 70° C.;

<4> The polyester resin for toner described in <1> or <2>, in which a proportion of a monomer unit derived from 1,2-propanediol is from 10 to 20% by mass with respect to a total mass of the polyester resin.

<5> The polyester resin for toner described in any one of <1> to <4>, the polyester resin containing the monomer unit derived from isosorbide at from 7 to 10% by mass with respect to a total mass of the polyester resin.

<6> The polyester resin for toner described in any one of <1> to <5>, the polyester resin containing a monomer unit derived from a tri- or higher carboxylic acid.

<7> The polyester resin for toner described in <6>, in which the monomer unit derived from a tri- or higher carboxylic acid is a monomer unit derived from trimellitic acid or its anhydride.

<8> The polyester resin for toner described in <7>, in which a proportion of trimellitic acid or its anhydride is from 5 to 25 parts by mole with respect to 100 parts by mole of the entire acid components contained in the entire monomers constituting the polyester resin.

<9> A method for producing a polyester resin for toner described in <1>, the method including:

a process of conducting polycondensation of a monomer mixture (A) containing a polyhydric alcohol containing isosorbide and 1,2-propanediol and a polycarboxylic acid, in which a content of isosorbide is from 2 to 11% by mass with respect to a total mass of the monomer mixture (A).

<10> The method for producing a polyester resin for toner described in <9>, in which at least one monomer selected from the group consisting of isosorbide and 1,2-propanediol is a biomass-based monomer.

<11> A method for producing a polyester resin for toner described in <3>, the method including:

a process of conducting polycondensation of a monomer mixture (A) containing a biomass-based monomer and a polycarboxylic acid, in which a content of the biomass-based monomer is 30% by mass or more with respect to a total mass of the monomer mixture (A) and a proportion of isosorbide in the monomer mixture (A) is from 2 to 11% by mass with respect to a total mass of the monomer mixture (A).

<12> The method for producing a polyester resin for toner described in any one of <9> to <11>, in which a tri- or higher carboxylic acid is contained as the polycarboxylic acid.

<13> The method for producing a polyester resin for toner described in <12>, in which the tri- or higher carboxylic acid is trimellitic acid or its anhydride.

<14> Toner containing the polyester resin for toner described in any one of <1> to <8>.

<15> A polyester resin for toner, the polyester resin containing:

a monomer unit derived from a polyhydric alcohol; and a monomer unit derived from a polycarboxylic acid, in which the monomer unit derived from a polyhydric alcohol contains a monomer unit derived from isosorbide and a monomer unit derived from 1,2-propanediol and a proportion of the monomer unit derived from isosorbide is from 2 to 11% by mass with respect to a total mass of the polyester resin, the polyester resin having a glass transition temperature (Tg) of from 56 to 70° C.;

<16> A polyester resin for toner, the polyester resin containing:

a monomer unit derived from a polyhydric alcohol; and a monomer unit derived from a polycarboxylic acid, in which the monomer unit derived from a polyhydric alcohol contains a monomer unit derived from a biomass-based monomer, the monomer unit derived from a biomass-based monomer contains a monomer unit derived from isosorbide, a proportion of the monomer unit derived from a biomass-based monomer is 30% by mass or more with respect to a total mass of the polyester resin, a proportion of the monomer unit derived from isosorbide is from 2 to 11% by mass with respect to a total mass of the polyester resin, and a glass transition temperature (Tg) of the polyester resin is from 56 to 70° C.

<17> The polyester resin for toner described in <15> or <16>, in which the monomer unit derived from a polycarboxylic acid contains a monomer unit derived from an aromatic dicarboxylic acid and a monomer unit derived from a tri- or higher carboxylic acid.

Effect of the Invention

According to the polyester resin for toner of the invention, toner excellent in storage stability, fixing property, hot offset resistance and image stability in the case of using isosorbide is obtained.

According to the method for producing a polyester resin for toner, it is possible to produce a polyester resin for toner from which toner excellent in storage stability, fixing property, hot offset resistance and image stability in the case of using isosorbide is obtained.

In addition, the toner of the invention is excellent in storage stability, fixing property, hot offset resistance and image stability in the case of using isosorbide.

MODE(S) FOR CARRYING OUT THE INVENTION

Hereinafter, the invention will be described in detail.

(Polyester Resin for Toner)

One embodiment of the polyester resin for toner of the invention is a polyester resin for toner, the polyester resin containing a monomer unit derived from isosorbide and a monomer unit derived from 1,2-propanediol, in which the proportion of the monomer unit derived from isosorbide is from 2 to 11% by mass with respect to the total mass of the polyester resin and a glass transition temperature (Tg) of the polyester resin for toner is from 56 to 70° C.

In addition, another embodiment of the invention is a polyester resin for toner, the polyester resin containing a monomer unit derived from a polyhydric alcohol and a monomer unit derived from a polycarboxylic acid, in which the monomer unit derived from a polyhydric alcohol contains a monomer unit derived from isosorbide and a monomer unit derived from 1,2-propanediol and the proportion of the monomer unit derived from isosorbide is from 2 to 11% by mass with respect to the total mass of the polyester resin, and a glass transition temperature (Tg) of the polyester resin for toner is from 56 to 70° C.

In other words, in one embodiment of the polyester resin for toner of the invention, the proportion of the monomer unit derived from isosorbide is preferably from 2 to 11% by mass and more preferably from 7 to 10% by mass with respect to the total mass of the polyester resin.

The storage stability of toner is favorable in a case in which the polyester resin for toner of the invention contains a monomer unit derived from isosorbide at 2% by mass or more with respect to the total mass of the polyester resin. In addition, the image stability of toner is favorable in a case in which the monomer unit derived from isosorbide is contained at 11% by mass or less with respect to the total mass of the polyester resin. The proportion of the monomer unit derived from isosorbide is preferably 7% by mass or more in terms of storage stability of toner and preferably 10% by mass or less in terms of the image stability of toner.

Incidentally, in order to set the proportion of the monomer unit derived from isosorbide to from 2 to 11% by mass with respect to the total mass of the polyester resin, the content of isosorbide in the entire amount of the mixture (A) may be set to from 2 to 11% by mass in the method for producing a polyester resin for toner of the invention which includes a process of conducting polycondensation of a monomer mixture (A) containing a polyhydric alcohol and a polycarboxylic acid (hereinafter, simply referred to as the mixture (A) in some cases). In addition, the proportion of the monomer unit derived from isosorbide is preferably from 7 to 10% by mass with respect to the total mass of the polyester resin.

In one embodiment of the invention, the "monomer unit derived from . . . " means a constitutional unit that contains one specific monomer backbone obtained by polycondensation of a specific monomer.

Furthermore, it is preferable that the polyester resin for toner of the invention contain a monomer unit derived from 1,2-propanediol. The storage stability of toner is favorable as the monomer unit derived from 1,2-propanediol is contained.

The proportion of the monomer unit derived from 1,2-propanediol in the polyester resin is preferably from 10 to 20% by mass and more preferably 10 to 18% by mass with respect to the total mass of the polyester resin. The storage stability of the toner obtained tends to be favorable as the proportion of the monomer unit derived from 1,2-propanediol is set to 10% by mass or more with respect to the total mass of the polyester resin. In addition, the fixing property of the toner obtained tends to be favorable as the proportion of the monomer unit derived from 1,2-propanediol is set to 20% by mass or less with respect to the total mass of the polyester resin.

In addition, it is possible to suppress the moisture absorption by isosorbide by the concurrent use of 1,2-propanediol and isosorbide and thus to increase the Tg of the polyester resin obtained, as a result, it is possible to secure the storage stability of toner.

In one embodiment of the invention, in order to set the proportion of the monomer unit derived from 1,2-propanediol to from 10 to 20% by mass with respect to the total mass of the polyester resin, the content of 1,2-propanediol in the total mass of the mixture (A) described above may be set to from 10 to 20% by mass.

In one embodiment of the invention, it is preferable that at least one monomer selected from the group consisting of isosorbide and 1,2-propanediol be a biomass-based monomer. In addition, it is more preferable that the biomass-based monomer be a monomer derived from a plant.

Isosorbide has a cyclic structure and thus can prevent a decrease in the glass transition temperature (Tg) in a case in which the ratio of the biomass-based raw material in the mixture (A) is increased, and can effectively prevent a deterioration in storage stability of toner.

It is possible to use a commercially available product as biomass-based isosorbide. Examples thereof may include Polysorb-P and Polysorb-PB manufactured by Roquette and a technical grade product and a polymer grade product manufactured by ADM.

In addition, in one embodiment of the invention, it is preferable that the polyester resin for toner contain a monomer unit derived from a biomass-based monomer at 2% by mass or more with respect to the total mass of the polyester resin for toner in order to reduce the environmental impact.

Meanwhile, for example, Japan Bio Plastics Society certifies the product in which the proportion of the biomass-based component is 25% by mass or more with respect to the entire amount of the raw materials or plastic product as a "biomass plastic" and approves the use of the certification mark awarded.

It is preferable that the polyester resin for toner contain the monomer unit derived from a biomass-based monomer at 30% by mass or more with respect to the total mass of the polyester resin in order to set the proportion of the biomass-based component to 25% by mass or more with respect to the entire amount of toner. It is possible to further reduce the environmental impact when the proportion of the monomer unit derived from a biomass-based monomer in the polyester resin for toner is 30% by mass or more with respect to the total mass of the polyester resin.

In other words, another embodiment of the invention is a polyester resin for toner, in which the proportion of the monomer unit derived from a biomass-based monomer is 30% by mass or more and the proportion of the monomer unit derived from isosorbide is from 2 to 11% by mass with respect to a total mass of the polyester resin and the glass transition temperature (Tg) of the polyester resin is from 56 to 70° C.

Incidentally, the measurement of the ratio of biomass in the raw materials or plastic product can be measured by ASTM D6866, the "Standard Test Methods for Determining the Biobased Carbon Content of Solid, Liquid, and Gaseous Samples Using Radiocarbon (C14) Analysis".

In other words, the ratio of C14 measured by ASTM D6866 in the polyester resin for toner of the invention is preferably 25% or more in the entire carbon.

In order to set the proportion of the monomer unit derived from a biomass-based monomer to 30% by mass or more with respect to the total mass of the polyester resin, the proportion of the biomass-based monomer contained in the total mass of the mixture (A) described above may be set to 30% by mass or more.

In addition, it is preferable that the monomer unit derived from a biomass-based monomer include the monomer unit derived from isosorbide. The proportion of the monomer unit derived from isosorbide is preferably from 2 to 11% by mass and more preferably from 7 to 10% by mass with respect to the total mass of the polyester resin.

Examples of the biomass-based monomer may include 1,2-propanediol and 1,3-propanediol which are derived from a plant raw material in addition to isosorbide derived from a plant raw material.

Examples of 1,2-propanediol derived from a plant raw material may include Bio Propylene Glycol Industrial Grade manufactured by ADM.

Examples of 1,3-propanediol derived from a plant raw material may include Susterra (registered trademark) (Du Pont).

The polyester resin for toner of the invention contains a monomer unit derived from a polyhydric alcohol and a monomer unit derived from a polycarboxylic acid, and the monomer unit derived from a polycarboxylic acid preferably includes a monomer unit derived from a dicarboxylic acid and more preferably includes a monomer unit derived from a tri- or higher carboxylic acid.

Examples of the dicarboxylic acid may include an aromatic dicarboxylic acid such as terephthalic acid, isophthalic acid, dimethyl terephthalate, dimethyl isophthalate, diethyl terephthalate, diethyl isophthalate, dibutyl terephthalate and dibutyl isophthalate or esters or anhydrides of these; and an aliphatic dicarboxylic acid such as phthalic acid, sebacic acid, isodecylsuccinic acid, dodecenylsuccinic acid, maleic acid, fumaric acid, adipic acid and succinic acid or esters or anhydrides of these. Among these, aromatic dicarboxylic acids or esters or anhydrides of these or aliphatic dicarboxylic acids are preferable from the viewpoint of improving the thermal characteristic, strength and image stability of the resin obtained. In particular, terephthalic acid and isophthalic acid are preferable in terms of being excellent in handling and cost. One kind of these other polyhydric alcohols may be used singly or two or more kinds thereof may be used concurrently.

The proportion of the monomer unit derived from an aromatic dicarboxylic acid is preferably from 75 to 95 parts by mole and more preferably from 80 to 95 parts by mole when the sum of the contents of all the acid components contained in the polyester resin for toner is set to 100 parts by mole. The storage stability of toner is more favorable when the proportion of the monomer unit derived from an aromatic dicarboxylic acid is 75 parts by mole or more and the hot offset resistance of toner is more favorable when the proportion is 95 parts by mole or less.

The proportion of the monomer unit derived from an aliphatic dicarboxylic acid is preferably 15 parts by mole or less and more preferably 10 parts by mole or less when the sum of the contents of all the acid components contained in the polyester resin for toner is set to 100 parts by mole. It is preferable that the proportion of the monomer unit derived from an aliphatic dicarboxylic acid be 15 parts by mole or less since the resin strength is enhanced and thus the durability of toner is favorable or the charging stability is improved and thus the image stability is more favorable.

It is preferable that the polyester resin for toner of the invention contain a monomer unit derived from a tri- or higher carboxylic acid.

The "tri- or higher carboxylic acid" refers to a carboxylic acid in which the number (valence) of carboxyl groups contained in one molecule is three or more.

In other words, a polyester resin which exhibits a high elastic modulus is obtained when containing a monomer unit derived from a tri- or higher carboxylic acid, and thus the hot offset resistance of toner is more favorable.

Examples of the tri- or higher carboxylic acid may include trimellitic acid, pyromellitic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid and 1,2,7,8-octanetetracarboxylic acid or esters or anhydrides of these. Among these, trimellitic acid or its anhydride is preferable in terms of being industrially easily available. One kind of these tri- or higher carboxylic acids may be used singly or two or more kinds thereof may be used concurrently.

The proportion of the monomer unit derived from a tri- or higher carboxylic acid is preferably from 5 to 25 parts by mole and more preferably from 5 to 20 parts by mole when the sum of the contents of all the acid components contained in the polyester resin for toner is set to 100 parts by mole. It is preferable that the proportion of the monomer unit derived from a tri- or higher carboxylic acid be 5 parts by mole or more since a polyester resin which exhibits a high elastic modulus is likely to be obtained and thus the hot offset resistance of toner is more favorable. On the other hand, it is preferable that the proportion of the monomer unit derived from a tri- or higher carboxylic acid be 25 parts by mole or less since the storage stability of toner is further improved and the control of the gelation reaction at the time of polycondensation is facilitated. In addition, the acid component refers to the "carboxylic acid component".

In one embodiment of the invention, in order to contain the monomer unit derived from a tri- or higher carboxylic acid in the polyester resin for toner, a tri- or higher carboxylic acid may be blended in the above mixture (A) so as to be in the preferable range described above. In addition, in one embodiment of the invention, the tri- or higher carboxylic acid is preferably from 3 to 15% by mass and more preferably from 5 to 12% by mass with respect to the total mass of the mixture (A).

In one embodiment of the invention, the polyester resin for toner may contain a monomer unit (hereinafter, also referred to as the "arbitrary monomer unit") other than the monomer units described above.

Examples of the arbitrary monomer unit may include a polyhydric alcohol other than isosorbide, 1,2-propanediol and 1,3-propanediol.

In order to contain the arbitrary monomer unit in the polyester resin for toner, a polyhydric alcohol (another polyhydric alcohol) other than isosorbide, 1,2-propanediol and 1,3-propanediol or a dicarboxylic acid may be blended in the above mixture (A).

Examples of another polyhydric alcohol may include an aliphatic diol such as ethylene glycol, neopentyl glycol, polyethylene glycol, 1,2-propanediol, 1,3-butanediol, 1,4-butanediol, diethylene glycol, triethylene glycol and 1,4-cyclohexanedimethanol; and an aromatic diol such as polyoxypropylene-(2.3)-2,2-bis(4-hydroxyphenyl)propane, polyoxyethylene-(2.0)-2,2-bis(4-hydroxyphenyl)propane, polyoxypropylene-(2.0)-2,2-bis(4-hydroxyphenyl)propane, polyoxypropylene-(2.2)-polyoxyethylene-(2.0)-2,2-bis(4-hydroxyphenyl)propane, polyoxypropylene(6)-2,2-bis(4-hydroxyphenyl)propane, polyoxypropylene(2.2)-2,2-bis(4-hydroxyphenyl)propane, polyoxypropylene-(2.4)-2,2-bis(4-hydroxyphenyl)propane and polyoxypropylene(3.3)-2,2-bis(4-hydroxyphenyl)propane. One kind of these other polyhydric alcohols may be used singly or two or more kinds thereof may be used concurrently.

Furthermore, the Tg of the polyester resin for toner of the invention is required to be from 56 to 70° C. The storage stability of toner is favorable in a case in which the Tg is 56° C. or higher and the fixing property of toner is favorable in a case in which the Tg is 70° C. or lower.

The Tg of the polyester resin for toner is determined by measuring using a differential scanning calorimeter. Specifically, the temperature, at the intersection point of the base line on the lower temperature side and the tangential line of the endothermic curve near the Tg on the chart obtained when measured at a temperature rising rate of 5° C./min after the melt quenching of the polyester resin for toner by heating at 100° C. for 10 minutes, is determined, and this is adopted as the Tg.

In addition, the softening temperature (T4) of the polyester resin for toner of the invention is preferably from 120 to 160° C. and more preferably from 130 to 150° C. The hot offset resistance of toner is likely to be favorable when the softening temperature is 120° C. or higher and the fixing property is likely to be favorable when the softening temperature is 160° C. or lower.

The T4 of the polyester resin for toner refers to the temperature when the ½ amount of 1.0 g of the sample is discharged through a nozzle to be 1 mmφ×10 mm under the condition of constant speed temperature rise with a load of 294 N (30 Kgf) and a temperature rising rate of 3° C./min.

Moreover, the acid value of the polyester resin for toner of the invention is preferably from 2 to 25 mg KOH/g. The reactivity of the resin tends to be improved in a case in which the acid value is 2 mg KOH/g or more and the image density of toner tends to be stabilized in a case in which the acid value is 25 mg KOH/g or less. In addition, the acid value is more preferably from 5 to 20 mg KOH/g.

The acid value of the polyester resin for toner is a value determined by dissolving 0.2 g of the polyester resin for toner in benzyl alcohol and titrating with a 0.02 N KOH benzyl alcohol solution using phenolphthalein as an indicator.

(Method for Producing Polyester Resin for Toner)

Next, the method for producing a polyester resin for toner of the invention will be described.

The polyester resin for toner is obtained, for example, by conducting polycondensation of the mixture (A) containing a polyhydric alcohol and a polycarboxylic acid under a polymerization condition to be described later.

The polyhydric alcohol contains isosorbide and 1,2-propanediol, and the content of isosorbide is from 2 to 11% by mass with respect to the total mass of the mixture (A).

In one embodiment of the invention, the polyester resin for toner can be produced by a producing method including a process to conduct polycondensation of the mixture (A) containing a polyhydric alcohol and a polycarboxylic acid in a molar ratio range of 1.05:1 to 1.5:1.

The storage stability of toner is favorable in a case in which the content of isosorbide in the mixture (A) is 2% by mass or more and the image stability is favorable in a case in which the content is 11% by mass or less. The content of isosorbide is preferably 7% by mass or more in terms of storage stability and it is preferably 10% by mass or less in terms of image stability.

The content of 1,2-propanediol in the mixture (A) is preferably from 10 to 20% by mass and more preferably from 10 to 18% by mass with respect to the total mass of the mixture (A). The storage stability of the toner obtained tends to be favorable as the content of 1,2-propanediol is set to 10% by mass or more and the fixing property of the toner obtained tends to be favorable as the content of 1,2-propanediol is set to 20% by mass or less.

It is possible to suppress the moisture absorption by isosorbide by the concurrent use of 1,2-propanediol and isosorbide, and thus it is possible to increase the Tg and to secure the storage stability.

In one embodiment of the invention, it is preferable that at least one monomer selected from the group consisting of isosorbide and 1,2-propanediol be a biomass-based monomer. In addition, the proportion of the biomass-based monomer contained in the mixture (A) is preferably 2% by mass or more with respect to the total mass of the mixture (A).

It is preferable that the mixture (A) contain a tri- or higher carboxylic acid as the polycarboxylic acid. A polyester resin which exhibits a high elastic modulus is obtained when containing a tri- or higher carboxylic acid, and thus the hot offset resistance of toner is more favorable.

Examples of the tri- or higher carboxylic acid may include those which are previously exemplified. In particular, trimellitic acid or its anhydride is preferable.

The content of the tri- or higher carboxylic acid in the mixture (A) is preferably from 5 to 25 parts by mole and more preferably from 5 to 20 parts by mole when the sum of the contents of all the acid components contained in the mixture (A) is set to 100 parts by mole. A resin which exhibits a high elastic modulus at a high temperature is likely to be obtained when the content of the tri- or higher carboxylic acid in the monomer mixture (A) is 5 parts by mole or more, and thus the hot offset resistance of toner tends to be more favorable. On the other hand, the storage stability of toner is further improved when the content of the tri- or higher carboxylic acid is 25 parts by mole or less, and thus the control of the gelation reaction at the time of polycondensation tends to be facilitated.

In addition, as one embodiment of the invention, the mixture (A) is required to contain a biomass-based monomer at 30% by mass or more with respect to the total mass of the mixture (A) in terms of reducing the environmental impact. Examples of the biomass-based raw material may include those which are known such as isosorbide, 1,2-propanediol and 1,3-propanediol which are derived from a plant raw material.

Examples of the polyhydric alcohol contained in the mixture (A) other than isosorbide, 1,2-propanediol and 1,3 propanediol may include the following alcohols.

An aliphatic diol such as ethylene glycol, neopentyl glycol, polyethylene glycol, 1,3-butanediol, 1,4-butanediol, diethylene glycol, triethylene glycol and 1,4-cyclohexanedimethanol and an aromatic diol such as polyoxypropylene-(2.3)-2,2-bis(4-hydroxyphenyl)propane, polyoxyethylene-(2.0)-2,2-bis(4-hydroxyphenyl)propane, polyoxypropylene-(2.0)-2,2-bis(4-hydroxyphenyl)propane, polyoxypropylene-(2.2)-polyoxyethylene-(2.0)-2,2-bis(4-hydroxyphenyl) propane, polyoxypropylene(6)-2,2-bis(4-hydroxyphenyl) propane, polyoxypropylene(2.2)-2,2-bis(4-hydroxyphenyl) propane, polyoxypropylene-(2.4)-2,2-bis(4-hydroxyphenyl) propane and polyoxypropylene-(3.3)-2,2-bis(4-hydroxyphenyl)propane. These can be used singly or in combination of two or more kinds.

Examples of the polycarboxylic acid contained in the mixture (A) may include the following carboxylic acids.

A dicarboxylic acid such as terephthalic acid, isophthalic acid, dimethyl terephthalate, dimethyl isophthalate, diethyl terephthalate, diethyl isophthalate, dibutyl terephthalate and dibutyl isophthalate or esters or anhydrides of these and an aliphatic dicarboxylic acid such as phthalic acid, sebacic acid, isodecylsuccinic acid, dodecenylsuccinic acid, maleic acid, fumaric acid, adipic acid and succinic acid or esters or anhydrides of these. Trimellitic acid, pyromellitic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid and 1,2,7,8-octanetetracarboxylic acid or esters or anhydrides of these. These can be used singly or in combination of two or more kinds.

Aromatic dicarboxylic acids or esters or anhydrides of these are preferable in consideration of the thermal characteristic, strength, image stability and the like of the resin obtained. In particular, terephthalic acid and isophthalic acid are preferable in terms of handling and cost.

Moreover, in the invention, a release agent may be added at the time of polycondensation of the polyester resin. The fixing property of toner and the wax dispersibility tend to be improved as a release agent is added at the time of polymerization. As the release agent, those which are the same as the wax used as a substance to be blended in the toner to be described later can be used, and examples thereof may include carnauba wax, rice wax, beeswax, synthetic ester-based wax, paraffin wax, various kinds of polyolefin wax or modified products thereof, fatty acid amides and silicone-based wax.

The polycondensation may be conducted by a known method, and examples thereof may include a method in which the mixture (A) containing a polycarboxylic acid and a polyhydric alcohol is introduced into a reaction vessel and polymerized via an esterification reaction or a transesterification reaction and a polycondensation reaction. At the time of polycondensation, for example, it is possible to use a polymerization catalyst such as titanium tetraalkoxide, titanium oxide, dibutyltin oxide, tin acetate, zinc acetate, tin disulfide, antimony trioxide, germanium dioxide, magnesium acetate.

The polymerization temperature is preferably in the range of from 180 to 280° C. and more preferably from 200 to 270° C. The productivity tends to be favorable in a case in which the polymerization temperature is 180° C. or higher and there is a tendency that the decomposition of resin or a by-product of volatile matters which is a cause of odor can be suppressed in a case in which the polymerization temperature is 280° C. or lower, thus it is preferable. The lower limit value of the polymerization temperature is more preferably 200° C. or higher and particularly preferably 220° C. or higher. The upper limit value of the polymerization temperature is more preferably 270° C. or lower.

(Toner)

Next, the toner using a polyester resin of the invention will be described.

Another embodiment of the invention is the use of a polyester resin which contains a monomer unit derived from isosorbide and a monomer unit derived from 1,2-propanediol, in which the proportion of the monomer unit derived from isosorbide is from 2 to 11% by mass with respect to the total mass of the polyester resin and of which the glass transition temperature (Tg) is from 56 to 70° C. as a raw material of toner or a method for producing toner using the polyester resin of the invention as a raw material. In addition, it is preferable that isosorbide and/or 1,2-propanediol be a biomass-based monomer.

In addition, another aspect of the invention is the use of a polyester resin in which the proportion of the monomer unit derived from a biomass-based monomer is 30% by mass or more with respect to the total mass of the entire monomer units constituting the polyester resin, the monomer unit derived from a biomass-based monomer includes a monomer unit derived from isosorbide and the proportion of the monomer unit derived from isosorbide is from 2 to 11% by mass with respect to the total mass of the polyester resin and of which the glass transition temperature (Tg) is from 56 to 70° C. as a raw material of toner or a method for producing toner using the polyester resin of the invention as a raw material.

The toner of the invention is obtained by blending the polyester resin of the invention, known additives such as a colorant, a charge control agent, a release agent and a fluidity modifier, a magnetic substance and the like.

Examples of the colorant may include carbon black, nigrosine, aniline blue, phthalocyanine blue, phthalocyanine green, Hansa yellow, Rhodamine-based dyes and pigments, chrome yellow, quinacridone, benzidine yellow, rose bengal, a triarylmethane-based dye, a monoazo-based dye, a disazo-based dye, a condensed azo-based dye and a pigment. The content of the colorant is not particularly limited but is preferably from 2 to 10% by mass with respect to the total mass of toner in terms of the color tone, image density or thermal characteristic of toner.

As the charge control agent, a quaternary ammonium salt or a basic or electron donating organic substance and the like may be exemplified as a positive charge control agent, and a metal chelate, a metal-containing dye, an acid or electron withdrawing organic substance and the like may be exemplified as a negative charge control agent. In the case of color tone of toner, it is preferable that the charge control agent be colorless or have a light color so as not to damage the color tone of toner, and examples thereof may include a salt of salicylic acid or alkyl salicylic acid with a metal such as chromium, zinc and aluminum, a metal complex, an amide compound, a phenol compound and a naphthol compound. Moreover, a styrene-based polymer, an acrylic acid-based polymer, a methacrylic acid-based polymer and a vinyl polymer having a sulfonic acid group may be used as a charge control agent.

The content of the charge control agent is preferably 0.5 to 5% by with respect to the total mass of the toner. The charged amount of toner tends to be in a sufficient level in a case in which the content of the charge control agent is 0.5% by mass or more and a decrease in charged amount due to aggregation of the charge control agent tends to be suppressed in a case in which the content is 5% by mass or less, thus it is preferable.

As the release agent, it is possible to appropriately select and use carnauba wax, rice wax, beeswax, polypropylene-based wax, polyethylene-based wax, synthetic ester-based wax, paraffin wax, fatty acid amides and silicone-based wax in consideration of the releasability, storage stability, fixing property, coloring property and the like of toner. The content of the release agent is not particularly limited but is preferably from 0.3 to 15% by mass with respect to the total mass of the toner.

Examples of other additives may include a fluidity improver such as silica, alumina and titania which are a fine powder, an inorganic fine powder such as magnetite, ferrite, cerium oxide, strontium titanate and conductive titania, a resistance adjusting agent such as a styrene resin and an acrylic resin and a lubricant. The total content of these additives is preferably from 0.05 to 10% by mass with respect to the total mass of the toner.

Moreover, as a binder resin, a binder resin other than the polyester resin of the invention may be used, and examples thereof may include a polyester resin other than the polyester resin of the invention, a styrene-based resin, a styrene-acrylic resin, a cyclic olefin resin, a methacrylic acid-based resin and an epoxy resin, and it is possible to use a mixture of two or more kinds.

In addition, the toner of the invention can also be used as any developer of a magnetic one-component developer, a non-magnetic one-component developer and a two-component developer.

(Method for Producing Toner)

The toner containing the polyester resin for toner of the invention as a raw material can be produced by a known method. Examples thereof may include a method (grinding method) in which the toner is produced by mixing the above-described binder resin containing the polyester resin of the invention and the substances to be blended together, then melt-kneading the mixture using a biaxial extruder or the like, coarsely grinding, finely grinding, subjecting to classification, and then subjecting to an external addition treatment of inorganic particles and the like if necessary, a method in which the toner is produced by dissolving or dispersing the binder resin described above and the substances to be blended in a solvent and granulating in an aqueous medium, then removing the solvent therefrom, and washing and drying the granules to obtain toner particles, and then adding inorganic particles to the toner particles thus obtained if necessary, or a method (chemical method) in which the toner is produced by preparing an emulsion using the binder resin described above and aggregating the binder resin together with a fine dispersion of the substances to be blended in an aqueous system, fusing and granulating, filtering, washing and drying to obtain toner particles, and then adding inorganic particles to the toner particles thus obtained if necessary.

EXAMPLES

Hereinafter, the invention will be described in more detail with reference to Examples and Comparative Examples. In addition, the evaluation was performed in the following manner.

(1) Evaluation Method of Polyester Resin (Glass Transition Temperature (Tg))

The temperature at the intersection point of the base line on the lower temperature side and the tangential line of the endothermic curve near the glass transition temperature on the chart obtained when measured at a temperature rising rate of 5° C./min after the melt quenching of the polyester resin using the differential scanning calorimeter DSC-60 manufactured by Shimadzu Corporation was determined.

(Softening Temperature)

The temperature when the ½ amount of 1.0 g of the sample was discharged through a nozzle to be 1 mm$\phi$×10 mm under constant speed temperature rise with a load of 294 N (30 Kgf) and a temperature rising rate of 3° C./min using the flow tester CFT-500D manufactured by Shimadzu Corporation was determined.

(Acid Value (AV))

In a branch Erlenmeyer flask, about 0.2 g of a sample was accurately weighed (A (g)), 20 ml of benzyl alcohol was added thereto, and the resin was dissolved by heating using a heater at 230° C. for 15 minutes under a nitrogen atmosphere. The solution was left to be cooled to room temperature, then 20 ml of chloroform and a few drops of phenolphthalein solution were added thereto, and the titration thereof was performed with a 0.02 N KOH benzyl alcohol solution (titer=B (ml), the potency of KOH benzyl alcohol solution=p). The blank measurement was performed in the same manner (titer=C (ml)), and the acid value was calculated according to the following Equation.

Acid value(mg KOH/g)=$(B-C)\times 0.02\times 56.11\times p\div A$ (2) Evaluation Method of Toner (Storage Stability)

About 5 g of the toner was weighed and introduced into a sample bottle, this was left to stand in a dryer maintained at 50° C. for 24 hours, and the extent of the aggregation of the toner was evaluated to use as an index of blocking resistance. The evaluation criteria were as follows.

S (significantly favorable): dispersed by only turning the sample bottle upside down.

A (favorable): dispersed by turning the sample bottle upside down and tapping 2 to 3 times.

B (usable): dispersed by turning the sample bottle upside down and tapping 4 to 5 times.

C (inferior): not dispersed even by turning the sample bottle upside down and tapping 5 times.

(Fixing Property)

A solid image to be 4.5 cm long×15 cm wide was created as the test pattern at a toner concentration of 0.5 mg/cm$^2$ using a printer which had a fixing roller not coated with silicone oil and of which the roller speed was set to 100 mm/s and the roller temperature was changeable and fixed by setting the temperature of the fixing roller to 145° C. The image density of this test pattern image was measured using the image densitometer manufactured by GretagMacbeth and recorded.

The part to be subjected to the density measurement is vertically folded a valley fold, a 1 kg weight was slid on the bent portion covered with a protective paper 5 times to create a crease, subsequently the same crease was folded a mountain fold, and a 1 kg weight was slid on the bent portion covered with a protective paper 5 times. The test paper was stretched, the cellophane tape (NITTO DENKO CS SYSTEM CORPORATION, No. 29) was pasted on the bent portion, traced 5 times and slowly peeled off therefrom, and the image density was measured using the image densitometer manufactured by GretagMacbeth. The same measurement was performed at 3 locations, the fixation ratio for each was calculated from the image densities before and after the test by the following Equation, and the fixing property was evaluated by the following criteria based on the average fixation ratio of the 3 locations.

Fixation ratio=image density after test/image density before test×100(%)

S (significantly favorable): a fixation ratio of 85% or more

A (favorable): a fixation ratio of 75% or more and less than 85%

C (inferior): a fixation ratio of less than 75% or unmeasurable due to the occurrence of offset phenomenon at 145° C.

(Hot Offset Resistance)

The lowest temperature at which the toner was transferred to the fixing roller by the hot offset phenomenon at the time of fixing when a solid image to be 4.5 cm long×15 cm wide was printed as the test pattern at a toner concentration of 0.5 mg/cm$^2$ for every 5° C. of the roller temperature using a printer which had a fixing roller not coated with silicone oil and of which the roller speed was set to 30 mm/s and the roller temperature was changeable was defined as the hot offset occurrence temperature, and the hot offset resistance was judged using the following criteria.

S (significantly favorable): hot offset does not occur at 200° C.

A (favorable): hot offset occurrence temperature is higher than 185° C. and 200° C. or lower C (inferior): hot offset occurrence temperature is 185° C. or lower (Image Stability)

A solid image to be 4.5 cm long×15 cm wide was continuously printed as the test pattern at a toner concentration of 0.5 mg/cm$^2$ and a fixing temperature of 170° C. using a printer which had a fixing roller not coated with silicone oil and of which the roller speed was set to 30 mm/s and the roller temperature was changeable in an environment at 25° C. and 80RH %. The change between the first image and the 5000-th image was visually evaluated under the following conditions.

A (favorable): there is no change in image density or the influence is little.

B (usable): there is a change in image density and it can be only used through the improvement by an additive.

C (inferior): there is a great change in image density.

Example 1

The polycarboxylic acid and the polyhydric alcohol presented in Table 1 and tetrabutyl titanate at 500 ppm with respect to the entire acid components were introduced into a reaction vessel equipped with a distillation column. Meanwhile, in Table 1, the parts by mole of each component when the entire acid components were set to 100 parts by mole and the percent by mass of each component were presented.

Subsequently, the rotation speed of the stirring blade in the reaction vessel was kept at 120 rpm, the temperature rise was started, the reaction system was heated so as to have an inner temperature of 265° C., and this temperature was held. The temperature in the reaction system was lowered after the esterification reaction was completed and the discharge of water from the reaction system was terminated, the pressure in the reaction vessel was reduced over about 40 minutes while maintaining the temperature at 225° C., the degree of vacuum was set to 133 Pa, and the polycondensation reaction was conducted while discharging the diol component from the reaction system.

The viscosity of the reaction system increased as the reaction proceeded, the degree of vacuum in the reaction system was increased by introducing nitrogen thereinto along with an increase in viscosity, and the polycondensation reaction was conducted until the torque of the stirring blade became the value indicating the desired softening temperature. Thereafter, stirring was stopped at the time point at which the predetermined torque was indicated. The pressure of the reaction system was increased to atmospheric pressure by the introduction of nitrogen immediately after stopping stirring, and the reaction product was taken out by pressurizing with nitrogen and cooled to 100° C. or lower, thereby obtaining a polyester resin. The characteristic values of the polyester resin thus obtained are presented in Table 1.

Subsequently, the preparation of toner was performed using the above polyester resin.

Using a Henschel mixer, 93 parts by mass of the polyester resin, 3 parts by mass of a quinacridone pigment (manufactured by Clariant, HOSTAPARM PINK E, C.I number: Pigment Red 122), 3 parts by mass of carnauba wax No. 1 (manufactured by TOYO ADL CORPORATION) and 1 part by mass of a negatively chargeable charge control agent (manufactured by Japan Carlit Co., Ltd., trade name: LR-147) were mixed for 5 minutes.

Subsequently, the mixture (A) thus obtained was melt-kneaded by a twin-screw kneader. The melt-kneading was performed by setting the inner temperature to the softening temperature of the resin. After kneading, a toner lump was obtained by cooling the resultant and finely grinded to be 10 μm or less using a jet mill fine pulverizer, and the particle size was put in trim by cutting the fine particles to be 3 μm or less using a classifier. To the 100 parts by mass of the fine powder thus obtained, 0.25 part by mass of silica (manufactured by Nippon Aerosil Co., Ltd., trade name: R-972) was added and mixed together using a Henschel mixer, thereby obtaining toner. The evaluation results of the toner thus obtained are presented in Table 1.

Examples 2 to 4 and Comparative Examples 1 to 5

The polyester resins were produced in the same manner as in Example 1 except that the amounts of the polycarboxylic acid the polyhydric alcohol introduced were changed to those presented in Tables 1 and 2. The characteristic values of the polyester resins thus obtained are presented in Tables 1 and 2.

Subsequently, the toner was obtained in the same manner as in Example 1 using the polyester resins thus obtained. The evaluation results of the toner thus obtained are presented in Tables 1 and 2.

TABLE 1

| | | | Example 1 | | Example 2 | | Example 3 | | Example 4 | |
|---|---|---|---|---|---|---|---|---|---|---|
| | | | Parts by mole | % by mass | Parts by mole | % by mass | Parts by mole | % by mass | Parts by mole | % by mass |
| Molar ratio introduced (parts by mole) | Polycarboxylic acid | Terephthalic acid | 90 | 52.4 | 90 | 59.2 | 90 | 50.8 | 90 | 51.8 |
| | | Anhydrous trimellitic acid | 10 | 6.7 | 10 | 6.8 | 10 | 6.5 | 10 | 6.7 |
| | Polyhydric alcohol | Diol A | 7 | 8.8 | 5 | 6.4 | 6 | 7.3 | 5 | 6.2 |
| | | Isosorbide (plant derived) | 8 | 4.1 | 12 | 6.2 | 20 | 9.9 | 15 | 7.6 |
| | | 1,3-propanediol (plant derived) | 40 | 10.7 | 55 | 14.8 | 48 | 12.4 | 55 | 14.5 |
| | | 1,2-propanediol (plant derived) | 65 | 17.3 | 48 | 12.9 | 50 | 12.9 | 50 | 13.2 |
| Weight introduced | Amount of isosorbide (% by mass) | | 4.1 | | 6 2 | | 9.9 | | 7.6 | |
| | Amount of 1,2-propanediol (% by mass) | | 17.3 | | 12.9 | | 12.9 | | 13.2 | |
| | Total weight of biomass-based monomers (% by mass) | | 32.1 | | 33.9 | | 35.3 | | 35.3 | |
| Physical properties of resin | Glass transition temperature (Tg) (° C.) | | 62.7 | | 57.4 | | 63.8 | | 57.8 | |
| | Softening temperature (T4) (° C.) | | 144 | | 137 | | 142 | | 136 | |
| | Acid value (AV) (mg KOH/g) | | 11.0 | | 12.2 | | 8.3 | | 5.4 | |
| Performance of toner | Storage property | | A | | A | | S | | A | |
| | Fixing property | | A | | A | | A | | A | |
| | Hot offset resistance | | A | | A | | A | | A | |
| | Image stability | | A | | A | | A | | A | |

TABLE 2

|  |  |  | Comparative Example 1 | | Comparative Example 2 | | Comparative Example 3 | | Comparative Example 4 | | Comparative Example 5 | |
| --- | --- | --- | --- | --- | --- | --- | --- | --- | --- | --- | --- | --- |
|  |  |  | Parts by mole | % by mass | Parts by mole | % by mass | Parts by mole | % by mass | Parts by mole | % by mass | Parts by mole | % by mass |
| Molar ratio introduced (parts by mole) | Polycarboxylic acid | Terephthalic acid | 90 | 54.2 | 90 | 51.7 | 90 | 54.2 | 90 | 52.4 | 90 | 42.7 |
|  |  | Anhydrous trimellitic acid | 10 | 7 | 10 | 6.6 | 10 | 7 | 10 | 6.7 | 10 | 5.5 |
|  | Polyhydric alcohol | Diol A | 5 | 6.5 | 6 | 7.5 | 4 | 5.2 | 5 | 6.3 | 30 | 30.9 |
|  |  | Isosorbide (plant derived) | 2 | 1.1 | 23 | 11.6 | 12 | 6.4 | 16 | 8.2 | 12 | 5 |
|  |  | 1,3-propanediol (plant derived) | 60 | 16.6 | 86 | 22.6 | 71 | 19.6 | 23 | 6.1 | 73 | 15.9 |
|  |  | 1,2-propanediol (plant derived) | 53 | 14.6 | — | — | 28 | 7.7 | 76 | 20.3 | — | — |
| Weight introduced | Amount of isosorbide (% by mass) | | 1.1 | | 11.6 | | 6.4 | | 8.2 | | 5 | |
|  | Amount of 1,2-propanediol (% by mass) | | 14.6 | | — | | 7.7 | | 20.3 | | — | |
|  | Total weight of biomass-based monomers (% by mass) | | 32.3 | | 34.2 | | 33.6 | | 34.6 | | 20.9 | |
| Physical properties of resin | Glass transition temperature (Tg) (° C.) | | 51.3 | | 56.2 | | 53 | | 74.9 | | 60.9 | |
|  | Softening temperature (T4) (° C.) | | 135 | | 136 | | 127 | | 156 | | 147.9 | |
|  | Acid value (AV) (mg KOH/g) | | 10.8 | | 13.9 | | 17.7 | | 12.9 | | 9.2 | |
| Performance of toner | Storage property | | C | | A | | C | | S | | A | |
|  | Fixing property | | A | | A | | A | | C | | A | |
|  | Hot offset resistance | | A | | A | | A | | A | | A | |
|  | Image stability | | A | | C | | A | | A | | A | |

The raw materials used in Tables 1 and 2 are as follows.

Diol A: polyoxypropylene-(2.3)-2,2-bis(4-hydroxyphenyl)propanediol

Isosorbide: Polysorb-PB (registered trademark) (manufactured by Roquette)

1,3-Propanediol: Susterra (registered trademark) propanediol (manufactured by Du Pont)

1,2-Propanediol: Bio Propylene Glycol Industrial Grade (manufactured by ADM)

Comparative Example 1 was deficient in the storage stability of toner since the proportion of the monomer unit derived from isosorbide in the polyester resin was small.

Comparative Example 2 was deficient in the image stability of toner since the proportion of the monomer unit derived from isosorbide in the polyester resin was too great.

Comparative Example 3 had a low Tg of the polyester resin and was deficient in the storage stability of toner.

Comparative Example 4 had a high Tg of the polyester resin and was deficient in the fixing property of toner.

INDUSTRIAL APPLICABILITY

According to the polyester resin for toner of the invention, it is possible to provide toner excellent in storage stability, fixing property, hot offset resistance and image stability in the case of using isosorbide.

According to the method for producing a polyester resin for toner of the invention, it is possible to provide a polyester resin for toner from which toner excellent in storage stability, fixing property, hot offset resistance and image stability in the case of using isosorbide is obtained.

The invention claimed is:

1. A polyester resin for toner, the polyester resin comprising:
    a monomer unit derived from isosorbide;
    a monomer unit derived from 1,2-propanediol; and
    a monomer unit derived from trimellitic acid or its anhydride,
    wherein:
    a proportion of the monomer unit derived from isosorbide is from 2 to 11% by mass with respect to a total mass of the polyester resin; and
    a glass transition temperature (Tg) of the polyester resin is from 56 to 70° C.

2. The polyester resin for toner according to claim 1, comprising a monomer unit derived from a biomass-based monomer at 2% by mass or more with respect to the total mass of the polyester resin.

3. The polyester resin for toner according to claim 1, comprising 30% by mass or more of a monomer unit derived from a biomass-based monomer with respect to a total mass of the polyester resin.

4. The polyester resin for toner according to claim 1, wherein a proportion of a monomer unit derived from 1,2-propanediol is from 10 to 20% by mass with respect to the total mass of the polyester resin.

5. The polyester resin for toner according to claim 1, the polyester resin comprising from 7 to 10% by mass of the monomer unit derived from isosorbide with respect to the total mass of the polyester resin.

6. The polyester resin for toner according to claim 1, wherein a proportion of trimellitic acid or its anhydride is from 5 to 25 parts by mole with respect to 100 parts by mole of all acid components contained in all monomers constituting the polyester resin.

7. A method for producing the polyester resin for toner according to claim 1, the method comprising conducting polycondensation of a monomer mixture (A) comprising a polyhydric alcohol comprising isosorbide, 1,2-propanediol, and a polycarboxylic acid comprising trimellitic acid or its anhydride,
    wherein a content of isosorbide is from 2 to 11% by mass with respect to a total mass of the monomer mixture (A).

8. The method of claim 7, wherein at least one of the isosorbide and the 1,2-propanediol is a biomass-based monomer.

9. The method for producing the polyester resin of claim 7, wherein the monomer mixture comprises a biomass-based monomer in an amount of 30% by mass or more with respect to a total mass of the monomer mixture (A).

10. A toner, comprising the polyester resin for toner according to claim 1.

11. The polyester resin for toner according to claim 1, wherein a proportion of a monomer unit derived from 1,2-propanediol is from 12.9 to 20% by mass with respect to the total mass of the polyester resin.

12. The polyester resin for toner according to claim 11, comprising 30% by mass or more of a monomer unit derived from a biomass-based monomer with respect to a total mass of the polyester resin.

13. The method of claim 7, wherein the monomer mixture comprises the trimellitic acid or its anhydride in an amount of 3 to 15% by mass with respect to a total mass of the monomer mixture (A).

* * * * *